(12) United States Patent
Kumer, Jr.

(10) Patent No.: US 6,591,554 B2
(45) Date of Patent: Jul. 15, 2003

(54) FLOOR MOUNTED FLUSH FOLDING DEVICE

(76) Inventor: John M. Kumer, Jr., 5937 Lake, Kingsville, OH (US) 44048

( * ) Notice: Subject to any disclaimer, the term of this patent is extended or adjusted under 35 U.S.C. 154(b) by 27 days.

(21) Appl. No.: 09/879,619

(22) Filed: Jun. 13, 2001

(65) Prior Publication Data

US 2002/0190545 A1 Dec. 19, 2002

(51) Int. Cl.[7] .............. B60N 3/04; E04H 3/11
(52) U.S. Cl. .................. 52/9; 52/10; 297/15
(58) Field of Search ............ 52/9, 10; 297/15; 296/65.05

(56) References Cited

U.S. PATENT DOCUMENTS

| 268,154 A | * | 11/1882 | Underhill et al. ........... 297/15 |
| 1,062,010 A | * | 5/1913 | Jacobson .................... 297/15 |
| 3,151,906 A | * | 10/1964 | Roberts ..................... 296/66 |
| 5,195,795 A | * | 3/1993 | Cannera et al. .......... 296/65.09 |
| 5,271,190 A | * | 12/1993 | Sugiyama .................... 297/15 |
| 5,979,964 A | * | 11/1999 | Ban et al. ............... 296/65.09 |

\* cited by examiner

*Primary Examiner*—Carl D. Friedman
*Assistant Examiner*—Basil Katcheves
(74) *Attorney, Agent, or Firm*—Forrest L. Collins

(57) ABSTRACT

A device, which may be placed in a floor such that the floor remains flush in the situation where the device is raised above the level of the floor or where the device is folded into the floor, is described herein.

12 Claims, 2 Drawing Sheets

FLOOR MOUNTED FLUSH FOLDING DEVICE

BACKGROUND OF THE INVENTION

1. Field of the Invention

The present invention relates to

2. Description of the Art Practices

U.S. Pat. No. 4,246,734 issued to Fogle, Jr., et al., Jan. 27, 1981 describes a fold down multi-purpose vehicle seat back core with an inmolded metal reinforcing member The seat back according to Fogle, Jr., et al., has a seat back core for a vehicle having a fold down seat which is also required to serve as a load floor. The core is blow-molded and formed with a pair of parallel spaced walls having tying links extending between the walls to strengthen and rigidify the core but not to prevent flexure thereof. There is a peripheral closing wall around the core. An elongate metal member is incorporated into the core at the time that it is blow-molded and becomes a permanent part of the core. It serves to limit the flexure of the core, provide additional strength and may serve as an anchor for securement of hardware.

Fogle, Jr., et al., in U.S. Pat. No. 4,142,757 issued Mar. 6, 1979 describes a fold down multi-purpose vehicle seat back core or the like automotive structural member. The automotive structural member is stated to be especially intended for use as a fold down multipurpose vehicle seat back core but is not limited to such use.

U.S. Pat. No. 4,527,828 issued to Groce, et al., on Jul. 9, 1985 relates to a side mounted jump seat for an automotive vehicle. The jump seat assembly is disclosed for use with vehicles, such as pickup trucks having extended cabs to provide for cargo space rearwardly of the front seat. The seat assembly is foldable into a recess in the side of the cab when stored so that it is flush with the adjacent interior trim structure. The seat assembly is supported in a cantilever fashion when moved to its seating position and is swingable about a skewed axis away from the rear of the cab when moved to its seating position so as to be located wholly outside of the recess and provide more room for a seated passenger.

Brown, et al., in U.S. Pat. No. 6,135,475 which issued on Oct. 24, 2000 describes a collapsible wheelchair is disclosed. The wheelchair includes a first wheel and a second wheel secured on opposites sides of a central support frame designed to support a seat member. The first wheel and the second wheel define a space within the circumference of each wheel. The central support frame includes a first frame member connected to the first wheel such that the first frame member may selectively move relative to the first wheel and a second frame member connected to the second wheel such that the second frame member selectively moves relative to the second wheel. A connecting member connects the first frame member to the second frame member in a manner permitting the first frame member and the second frame member to be selectively moved toward and away from each other, thereby, permitting the collapse of the wheelchair.

Brown, et al., further describes the wheelchair further includes at least one guide wheel coupled to the central support frame for supporting the wheelchair. In use, the wheelchair is collapsed by moving the first frame member and the second frame member relative to the first wheel and the second wheel, respectively, to position the first frame member and the second frame member substantially within the space defined by the first wheel and the second wheel, and simultaneously collapsing the connecting member to permit the first frame member and the second frame member to be drawn toward each other.

U.S. Pat. No. 5,562,325 issued to Moberg on Oct. 8, 1996 recites a vehicle seat lock arrangement comprises a seat with a sitting portion and a back supporting portion, elements for changing the position of at least a portion of the seat relative to a body part of the vehicle, and first and second interengageable lock elements releasably interconnecting the seat with the body part of the vehicle. A switch which is operatively connected with at least one of the lock elements, has a first switch state in which the first and second lock elements securely and mutually interconnect, and a second switch state in which the first and second lock elements are at least not securely interconnected. The switch forms part of an electric circuit having elements for signalling at least the second switch state.

Sweers, in U.S. Pat. No. 4,822,092 issued Apr. 18, 1989 provides a description of a seat cushion frame is mounted on a vehicle floor panel by a composite anchor member adapted to be snap-fitted into position in a panel aperture. The anchor member includes a plastic lower shell part bonded to an upper rubber seal ring part. The shell part has an oval-section hollow socket portion with its upper open end, adapted to receive a frame mounted striker, formed with a peripheral inverted U-section collar portion ending in a V-section terminal spring flange. The rubber seal ring provides a right-angled section defining a horizontal sealing lip portion and vertical neck portion formed with a resilient shoulder adapted to lockingly engage the rolled edge of the floor panel aperture.

The seal ring part, according to Sweers, is formed with a U-shaped loop bonded to the inner surface of the shell socket defining vertically disposed wedge-shaped ribs having opposed ramp faces establishing a lead-in gaped notch. Upon the striker bight portion being received in the notch and pushed downwardly the resultant wedging action causes the shell socket and opposed collar portions to deform outwardly allowing the bight portion to snapingly pass through the gap for locking capture in the anchor member.

U.S. Pat. No. 4,813,722 issued to Viscome, et al., Mar. 21, 1989 describes a locking device for a vehicle fold-down seat backrest. The locking device for a latching and locking mechanism wherein upon a motor vehicle rear seatback being unlocked it adapted to be unlatched for swinging to a fold-down position by pivoting a handle portion of an operating lever providing pass through access between the vehicle passenger compartment and rear storage trunk.

The locking device, pursuant to the Viscome, et al., provides a key locking cylinder which in its locked mode has a lock bar biased in one direction such that its one end contacts a cam segment on the cylinder. The lock bar is formed with a pair of notches spaced on centers equal to the spacing between support webs of a pivoting operating lever. The notches are positioned to block the pivoting of the lever in the cylinder locked mode by being misaligned with the support webs. Upon the lock bar being shifted by the cam segment, as a result of the cylinder being rotated by the key, the notches are aligned with the support webs allowing latch tripping movement of the operating lever probe to free the striker allowing the backrest to be swung to its fold-down unlatched position.

U.S. Pat. No. 4,750,778 issued to Hoban on Jun. 14, 1988 describes pickup trucks whereby two or three seat pickups may be transformed into four or five seat pickup truck convertibles. The invention consists of a modified pickup truck cab section that doubles as a rearwardly facing jump seat and a truck bed that offers a mechanism to secure the jump seat in place and a passenger restraint for those riding in the jump seat. The device facilitates the conversion without the use of additional parts or frame reinforcements.

Nikitits, et al., in U.S. Pat. No. 3,994,527 issued Nov. 30, 1976 recites a collapsible combined table and seat assembly including an improved collapsible linkage for rigidly supporting the seats and for supporting the table on the seats. The linkages rely on knock down rigided triangular structures, one for supporting each seat and one extending between the seats and the table top.

U.S. Pat. No. 5,797,649 issued to Snell, Jr., et al., on Aug. 25, 1998 describes a folding seat assembly has a seat mounted for pivoting movement toward and away from a back-support section. The seat includes a first panel and a second panel mounted for pivoting movement with respect to the first panel so that the two-panel seat "folds in half." The seat support pedestal also folds in half and the back-support section pivots for stowage. The stowed, folded seat assembly is nominally one-half of the width of the same seat assembly unfolded for use. A new method for folding an auxiliary seat assembly for stowing includes folding the seat second panel toward the first panel to form a folded seat. The folded seat is then urged against the back-support section and for stowing, both the seat and support section are depressed against the vehicle component, e.g., a fender.

U.S. Pat. No. 5,620,225 issued to Harry on Apr. 15, 1997 recites a device for the removable fastening to a floor of the underframe of a seat and its application especially to land-based motor vehicles.

Demick, et al., in U.S. Pat. No. 6,059,358 issued May 9, 2000 describes a seat back mounted fold down auto office having a bin portion mounted to the seat back of a vehicle seat assembly on the rear side thereof including a recessed storage area therein. A cover is provided for the recessed storage area and is rotatable upon a hinge to move the cover from a closed position to an open position to access the recessed storage area. Additional features include a fold out support panel that can rotate out from the storage bin toward a user after which the storage bin can be closed while the support panel extends from the storage bin. The support panel can be used to attach a notepad or and/or cellular telephone. In addition, the cover can be equipped with a light to illuminate the storage area in the bin.

To the extent that the foregoing patents and citations are relevant to the present invention they are herein incorporated by reference.

SUMMARY OF THE INVENTION

The present invention describes a floor mounted folding device comprising:

a floor;

said floor having an upper floor surface;

said upper floor surface of said floor comprised of a fixed upper floor surface, a first rotatable upper floor surface, and a second rotatable upper floor surface;

said upper floor surface of said floor having surface means defining an floor opening in said floor;

said upper floor surface having at least one floor support located beneath said upper surface of said floor;

said at least one floor support having a first pivot connector located below said floor opening and said first pivot connector connecting said at least one floor support to said first rotatable upper floor surface, so that when in use, said first pivot connector permits pivoting said first rotatable upper floor surface through an arc at least partially defined by said upper surface of said floor and a point above said upper surface of said floor with the center point of the arc being the said first pivot connector;

said at least one floor support having a second pivot connector located below said floor opening and said second pivot connector connecting said at least one floor support to said second rotatable upper floor surface, so that when in use, said second pivot connector permits pivoting said second rotatable upper floor surface through an arc at least partially defined by said upper surface of said floor and a point above said upper surface of said floor with the center point of the arc being the said second pivot connector; and said at least one floor support having a third pivot connector located below said floor opening said third pivot connector connecting said at least one floor support to a rising member so that when in use, said third pivot connector permits pivoting said rising member through an arc at least partially defined by said upper surface of said floor and a point above said upper surface of said floor with the center point of the arc being the said third pivot connector.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
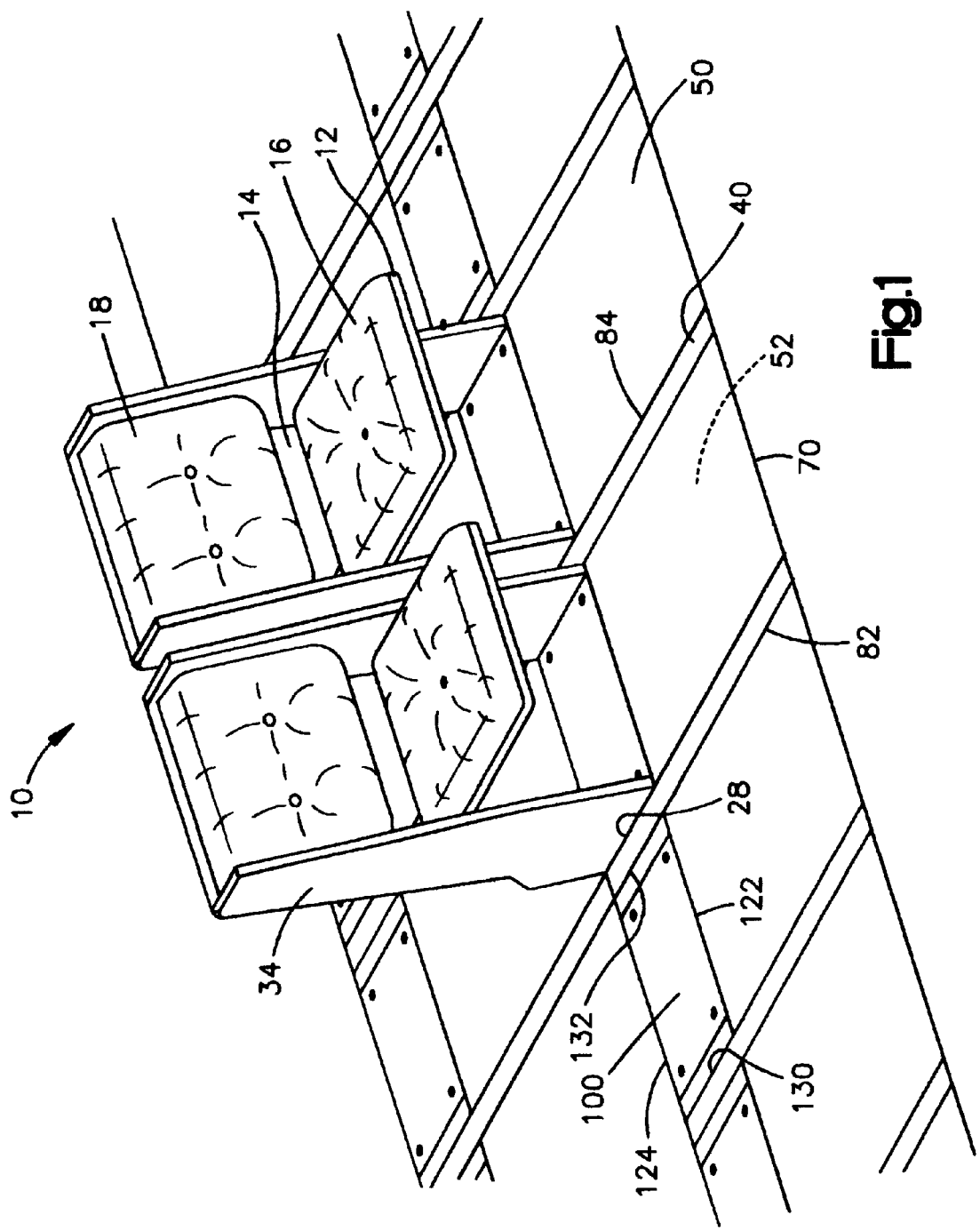
FIG. 1 is a frontal perspective of a finished product embodiment according to the invention.

As best seen in FIG. 1, is a finished article according to the present invention. In particular, the present invention relates to a chair which may be folded and unfolded from the beneath the surface of a floor. It is desirable to have open space in areas such as an auditorium or church building. It is also desirable to have readily available seating, which is configured in a separate arrangement.

The chair 10 is firmly mounted when in the fully assembled position is shown in FIG. 1. The chair 10 has a seat 12 and a back 14. If desired, cushions may be a fixed to the seat 12 and the back 10 as seat cushion 16 and back cushion 18. The chair 10 is shown as terminating with a foot 28 and a chair side support 34. The chair side support has a chair back segment 36.

Figure 2:
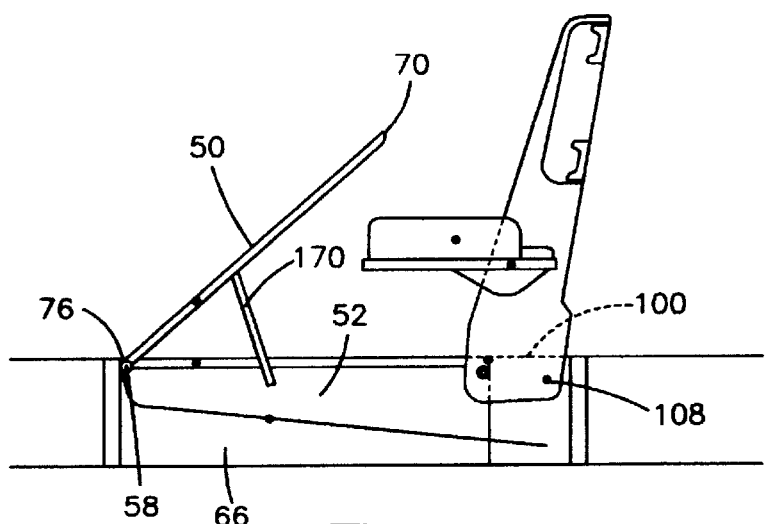
FIG. 2 is a side view according to the invention.

When the chair 10 is not in use it is hidden beneath the fixed floor surface 40 of the building (not shown). A first rotatable upper floor surface 50 is shown in a partially open position (floor opening 52) in FIG. 2. The first rotatable upper floor surface 50 is fixedly connected by a pivot connector 58 located beneath the fixed upper floor surface. Conveniently, the pivot connector 58 is fixed by means of a nut and bolt (not shown) to a floor joist 66. The pivot connector 58 may be of any conventional construction which will permit the first rotatable upper floor surface 50 to be rotated in an arc where the center point of the arc is approximately the pivot connector 58. The first rotatable upper floor surface 50 has a first rotatable upper floor surface leading edge 70 and a first rotatable upper floor surface trailing edge 76. The first rotatable upper floor surface 50 has two first rotatable upper floor surface side edges 82 and 84.

A second rotatable upper floor surface 100 is shown in a closed position in FIG. 1. A second pivot connector 108 located beneath the fixed upper floor surface 40 fixedly connect with the second rotatable upper floor surface 100. Conveniently, the second pivot connector 58 is fixed by means of a nut and bolt (not shown) to the floor joist 66. The second pivot connector 58 may be of any conventional construction which will permit the second rotatable upper floor surface 100 to be rotated in an arc where the center point of the arc is approximately the pivot connector 58.

The second rotatable upper floor surface 100 has a second rotatable upper floor surface leading edge 122 and a second rotatable upper floor surface trailing edge 124. The first rotatable upper floor surface 50 has two second rotatable upper floor surface side edges 130 and 132.

When the first rotatable upper floor surface 50 and the second rotatable upper floor surface 100 are in the closed position, the first rotatable upper floor surface 50 leading edge 70 abuts the second rotatable upper floor surface leading edge 122. It is important to note that young children and the elderly are often the users of the auditorium or church building. Accordingly, it is important that no exposed gaps in the floor should exist for safety considerations.

The chair 10 is fixedly connected by a third pivot connector 140 located below the floor opening 52 to a floor joist 66. The chair 10 is, following the opening of the first rotatable upper floor surface 50 and the second rotatable upper floor surface, rotatable to a position where a person is able to sit. After the user is finished positioning the chair 10 above the floor opening 52 the first rotatable upper floor surface 50 is rotated through the reverse arc to a closed position.

Thereafter, the second rotatable upper floor surface 100 is rotated through its reverse arc to a closed position. As previously noted, the first rotatable upper floor surface 50 leading edge 70 abuts the second rotatable upper floor surface leading edge 122 to effectively form a continuous floor surface.

If desired, a retainer 170 may be utilized to retain the first rotatable upper floor surface 50 in open position to avoid inadvertent closure of the first rotatable upper floor surface 50. The retainer 170 may be a simple rod fixedly connected at one end to the floor support and the other end to the first rotatable upper floor surface 50. The retainer 170 may also be a piston mechanism which will aid the opening of the first rotatable upper floor surface 50 as well as controlling closure of the first rotatable upper floor surface 50.

Is also possible to utilize a second retainer (not shown) to maintain the second rotatable upper floor surface 100 in an open position. This feature is not exemplified, as it is not felt that a second retainer is required due to the small size of the second rotatable upper floor surface 100.

Figure 3:
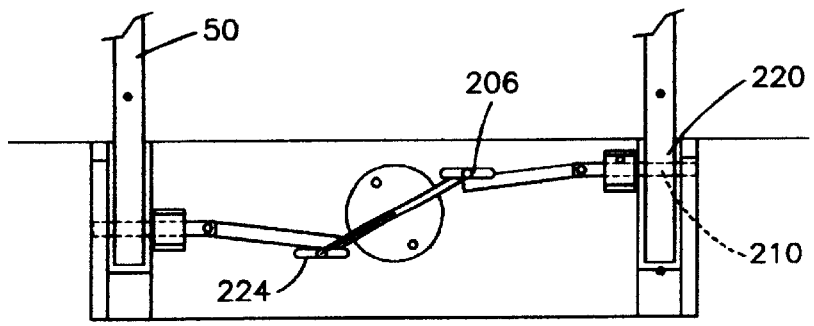
FIG. 3 is a side view according to the invention.
Figure 4:
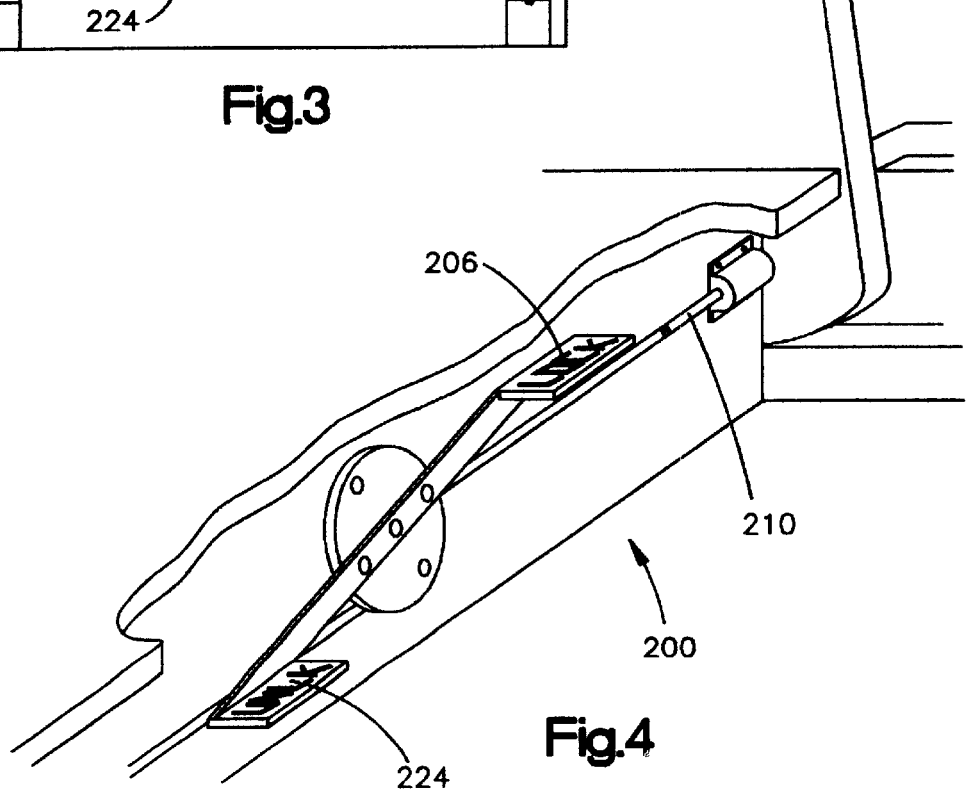
FIG. 4 is a perspective of a finished product embodiment according to the invention.

The chair 10 is conveniently maintained a locked position by closure of the first upper floor surface and the second upper floor surface. However, if desired a chair 10 locking mechanism such as the locking mechanism 200 shown in FIG. 3 may be employed. Depression of the locking foot pedal 206 inserts a pin 210 into an opening 220 in the base of the chair 10 thereby locking the chair into a stable seating position. The depression of the second pedal 224 on the locking mechanism 200 releases the pin 210 from the opening 220 in the base of the chair 10.

In operation, the first upper floor surface 50 is opened to expose the chair 10. The second upper floor surface 100 is also opened to fully access to the chair 10. The chair 10 is then pivoted on the pivot connector 58 into the open position. The first upper floor surface 50 is then closed. Then the second upper floor surface 100 is closed. As the foot 28 of the chair 10 rests on the first upper floor surface 50 the chair 10 and first floor surface 50 are both stabilized. The first upper floor surface 50 is further stabilized in the closed position by its resting on the chair back segment 36.

What is claimed is:

1. A floor mounted folding device comprising:
   a floor;
   said floor having an upper floor surface;
   said upper floor surface of said floor comprised of a fixed upper floor surface, a first rotatable upper floor surface, and a second rotatable upper floor surface;
   said upper floor surface of said floor having surface means defining an floor opening in said floor;
   said upper floor surface having at least one floor support located beneath said upper surface of said floor;
   said at least one floor support having a first pivot connector located below said floor opening and said first pivot connector connecting said at least one floor support to said first rotatable upper floor surface, so that when in use, said first pivot connector permits pivoting said first rotatable upper floor surface through an arc at least partially defined by said upper surface of said floor and a point above said upper surface of said floor with the center point of the arc being the said first pivot connector;
   said at least one floor support having a second pivot connector located below said floor opening and said second pivot connector connecting said at least one floor support to said second rotatable upper floor surface, so that when in use, said second pivot connector permits pivoting said second rotatable upper floor surface through an arc at least partially defined by said upper surface of said floor and a point above said upper surface of said floor with the center point of the arc being the said second pivot connector; and
   said at least one floor support having a single third pivot connector located below said floor opening said single third pivot connector connecting said at least one floor support to a rising member so that when in use, said single third pivot connector permits pivoting said rising member through an arc at least partially defined by said upper surface of said floor and a point above said upper surface of said floor with the center point of the arc being the said single third pivot connector.

2. The floor mounted folding device according to claim 1, further comprising a first retainer connecting said first rotatable upper floor surface to said at least one floor support, for when in use, to restrain the rotation of said first rotatable upper floor surface.

3. The floor mounted folding device according to claim 1, further comprising a first retainer connecting said first rotatable upper floor surface to said at least one floor support, for when in use, to restrain the rotation of said first rotatable upper floor surface and to maintain said first rotatable upper floor surface in an open position.

4. The floor mounted folding device according to claim 1, further comprising a second retainer connecting said second rotatable upper floor surface to said at least one floor support, for when in use, to restrain the rotation of said second rotatable upper floor surface.

5. The floor mounted folding device according to claim 1, further comprising a locking mechanism connected to said at least one floor support and to said rising member, for when in use, to lock said rising member in a fixed position above said fixed upper floor surface.

6. The floor mounted folding device according to claim 5, wherein said locking mechanism is a pedal operated locking mechanism.

7. The floor mounted folding device according to claim 1, wherein said at least one floor support has an upper surface below said fixed upper floor surface, for when in use, to support said first rotatable upper floor surface.

8. The floor mounted folding device according to claim 1, wherein said at least one floor support has an upper surface below said fixed upper floor surface, for when in use, to support said second rotatable upper floor surface.

9. The floor mounted folding device according to claim 1, wherein said rising member has at least one foot region and at least one back section.

10. The floor mounted folding device according to claim 9, wherein said at least at least one back section of said rising member provides support to said first rotatable upper floor surface when said first rotatable upper floor surface is rotated to be flush with said upper floor surface.

11. The floor mounted folding device according to claim 9, wherein said at least one foot region of said rising member rests on said first rotatable upper floor surface after said first rotatable upper floor surface is first rotated to permit said rising member to rotate and said first rotatable upper floor surface is again rotated to position flush with said upper floor surface.

12. The floor mounted folding device according to claim 1, wherein said rising member further comprises a seat.

* * * * *

UNITED STATES PATENT AND TRADEMARK OFFICE
CERTIFICATE OF CORRECTION

PATENT NO.     : 6,591,554 B2
DATED          : July 15, 2003
INVENTOR(S)    : John M. Kume, Jr.

It is certified that error appears in the above-identified patent and that said Letters Patent is hereby corrected as shown below:

<u>Title page,</u>
Item [75], Inventor, should read: -- John M. Kume, Jr. --

Signed and Sealed this

Eighth Day of June, 2004

JON W. DUDAS
*Acting Director of the United States Patent and Trademark Office*